United States Patent [19]

Boulanger

[11] 4,140,423
[45] Feb. 20, 1979

[54] METHOD OF STORING LIQUEFIED GASES AT LOW TEMPERATURE IN A SUBTERRANEAN CAVITY

[75] Inventor: Alain Boulanger, Paris, France

[73] Assignee: Societe Francaise de Stockage Geologique "Geostock", Paris, France

[21] Appl. No.: 853,507

[22] Filed: Nov. 21, 1977

[30] Foreign Application Priority Data

Dec. 2, 1976 [FR] France .................. 76 36369

[51] Int. Cl.² .................. B65G 5/00
[52] U.S. Cl. .................. 405/53; 62/45
[58] Field of Search .................. 61/0.5, 36 A, 35; 62/45

[56] References Cited

U.S. PATENT DOCUMENTS 3,205,665 9/1965 Van Horn .................. 61/0.5
3,392,530 7/1968 Brandt .................. 61/0.5

Primary Examiner—Jacob Shapiro
Attorney, Agent, or Firm—Diller, Ramik & Wight

[57] ABSTRACT

During the process of cooling, the stresses in the earth pass first through a maximum compression and then this gives place to traction up to the moment when fissures appear. The application of cooling is conducted so as to reduce the size of these fissures and to prevent their propagation through the compressed zone. They are plugged preferably by spraying water in the course of application of cooling.

12 Claims, 1 Drawing Figure

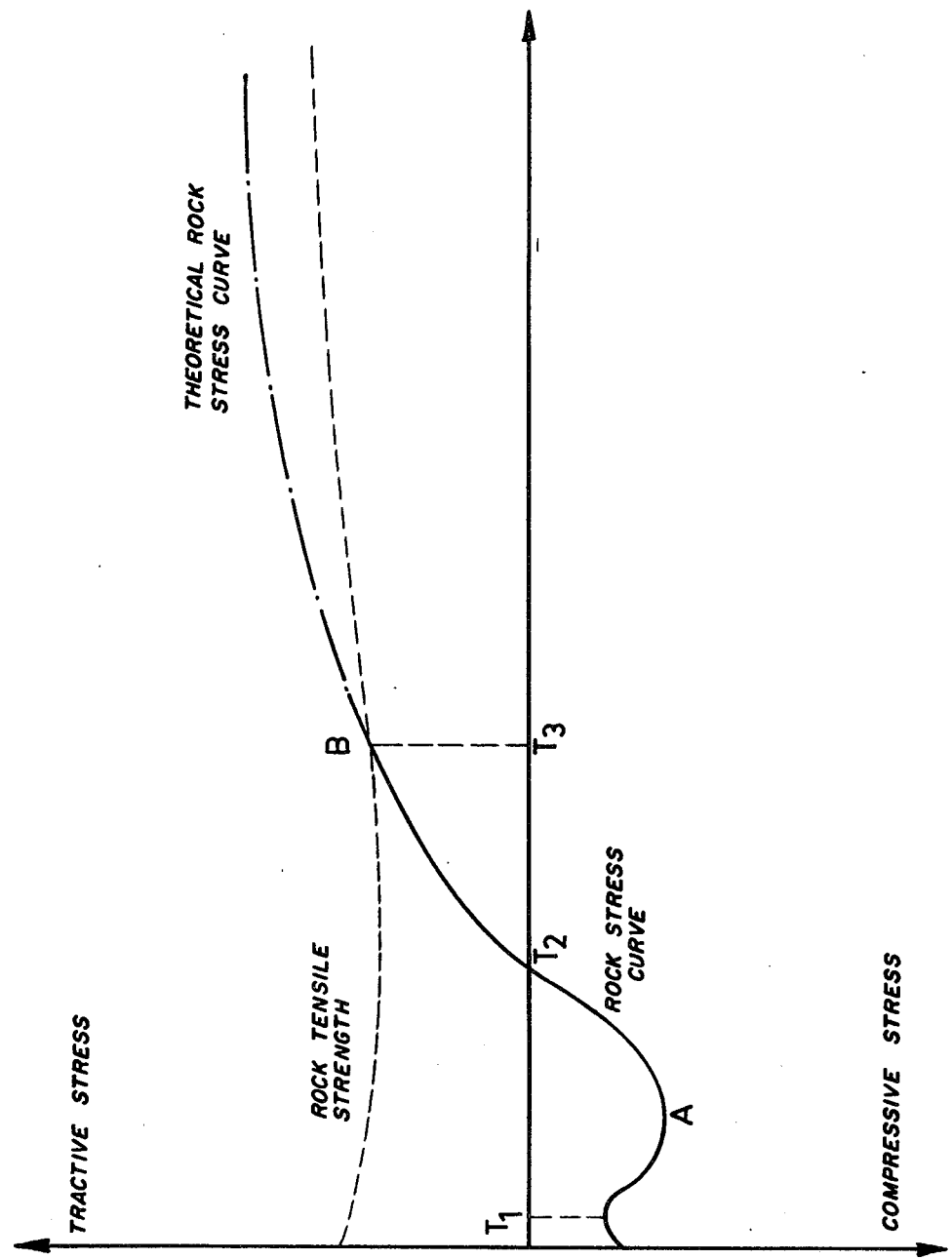

METHOD OF STORING LIQUEFIED GASES AT LOW TEMPERATURE IN A SUBTERRANEAN CAVITY

BACKGROUND OF THE INVENTION

1. Field of the Invention

The present invention relates to a method of storing liquefied gases in a subterranean cavity.

2. Description of the Prior Art

It is known to store liquefied gases at very low temperature, for example natural gas, in reservoirs placed on the surface of the ground or in partly buried reservoirs, excavated in the ground and covered by an arch, for example of metal. These techniques have the drawback of a limited unitary capacity of the reservoirs, for safety reasons.

Storage techniques are also known in which a liquefied gas is stored in the earth, in cavities where it is at the temperature of the ambient medium and under relatively high pressure; the depth of the cavity is then selected so that the hydrostatic pressure of the earth exceeds that of the stored liquid, but these techniques are expensive, in particular in the case of substances with high vapour pressure.

Various methods have been proposed to store liquefied gases and in particular gases liquefied at very low temperature such as natural gas, in subterranean cavities, the sealing of the latter being produced by freezing of the earth. The liquefied gas is then at a pressure close to atmospheric pressure. Hitherto these methods have encountered various difficulties, principally connected with fissures which either existed in the earth before the excavation of the cavity, or appeared at the beginning or in the course of the operation of the installation. According to the particular case, these fissures resulted in the entry of water which is difficult to arrest especially if this appeared only after the beginning of cooling, that is to say at a moment where intervention has not been planned, or even leakages of gas of the surface, which also, are only generally detected after the beginning of the application of cooling or of the operation of the installation.

In the French patent application No. 2,240,165 a method of cryogenic storage is proposed in which the rock is previously cooled to a temperature below the temperature of the utilisation of the storage. Fissures in the rock are created or widen at this moment, and they are plugged with a substance freezing at low temperature, and then the cavity is heated to the temperature of use. In this way there is created in the rock a zone of compression which ensures sealing. There is provided, around the zone where the rock contains plugging material solidified in its fissures, a zone where the plugging material is liquid, and this zone constitutes, it seems, a safety zone which should arrest a newly appearing fissure.

In summary, the fluid-tightness of the subterranean cavity is ensured by the freezing of a substance artificially introduced into the surrounding formation and penetrating into the fissure created by the shrinkage of the rock under the effect of freezing. This freezing product is an organic compound, which increases the cost of the method, all the more as one is obliged, by discretion, to place considerable amounts of it around the reservoir.

In U.S. Pat No. 3,392,530, it is proposed to plug the fissures of the rock surrounding the cavity by the injection into the latter of gas at a temperature below the freezing point of water, at a pressure balancing the hydrostatic pressure. The gas employed has a vapour pressure higher than or equal to that of butane. Since this substance has a melting point of $-0.5C$, it is not seen very well how it is possible to keep it under pressure at a sufficient temperature to freeze water which can contain much dissolved salts. In any case, after the freezing of the water in the walls if it is desired to store a liquefied gas at low temperature it would be necessary to proceed with considerable additional cooling and nothing is provided in this patent to prevent or treat the fissures which appear during this cooling period. Moreover, in this patent, the walls of the cavity are not observed, and it is only said that the circulation of the cooling gas is continued until the walls are completely plugged by the ice (column 4, lines 74–75). It is possible, for example, to assure it by lowering the gas pressure somewhat and by observing the flow rate of the exhaust pump.

In summary, in this method, the walls of the cavity and the mass are not observed during the period of cooling, and if intervention takes place to modify the programme, it is only during the initial freezing which is not concerned by the present invention.

But, this method does not correspond to the problem of overcoming the fissures which appear in the course of the whole of the cooling and the duration of the storage life. In addition, it requires the use of large amounts of butane or similar gas, with which there is a complication, notably hindering possible manual intervention in the cavity.

It is an object of the present invention to provide a method of storing liquefied gas in a subterranean cavity whose fluid-tightness is essentially obtained by the freezing of the earth, and in which, during the whole life period of storage, the drawbacks due to the entry of water, or gas leakages, are avoided.

The studies which gave rise to the present invention enabled it to be observed that the drawbacks which have just been mentioned had their origin principally in the process of cooling the cavity, before its filling or at the beginning of the latter.

GENERAL DESCRIPTION OF THE INVENTION

In a method according to the present invention the walls of the cavity and the surrounding mass are observed during the whole period of cooling and intervention takes place, according to these observations, by modifying the initial cooling programme and/or repairing the disturbances which have appeared.

The studies which are at the origin of the present invention have also shown the existence of a risk of gas leakage during the period of exploitation of the reservoir, and hence it was appropriate to take certain precautions. According to the invention, preferably, the cavity is hollowed to a depth calculated so that up to the end of the planned utilisation, the frozen zone is below the phreatic level. The reason for operating in this manner will be explained below.

Preferably, as will be explained in more detail in the following, for the application of cooling, a temperature variation relationship is followed obeying the two criteria of maintaining at the compression zone existing around the cavity a width such that it arrests the propagation of the majority of fissures capable of causing an entry of water into the cavity, and of obtaining in the earth, stress gradients such that they do not cause the appearance of such fissures.

It is preferred that at least certain of the operations be done by a human operator in the course of the cooling, for example the repair of certain disturbances, like exceptional fissures, or even the systematic plugging of the fissures.

In fact, according to a preferred embodiment of the invention, in the course of the application of cooling, the fissures opening in the wall of the cavity are plugged, this operation being done on, or in the vicinity of, this wall at a temperature where these fissures have a size such that their subsequent movements cannot break the fluid-tightness of the obturation. Preferably, this obturation is produced by spraying water which freezes on the walls and forms a substantially continous layer at least in certain zones.

Preferably also, the initial cooling is done by the introduction of cold gas, such as air, into the cavity.

The terms employed above and the whole of the invention will now be explained in more detail with the assistance of the single FIGURE, which is a diagram of the stresses in rock, as a function of temperature.

The studies which have resulted in the present invention were directed firstly to the nature of the stresses which appear in rock during its cooling, as a function of the temperature reached.

In the appended diagram, there are drawn as ordinates upwards the theoretical tractive stresses, and downwards the compressive stresses, in rock saturated with water, during cooling between ambient air and $-160°$ C.

This diagram was obtained by calculation from experimental determination of the thermo-mechanical characteristics of various types of rock.

The curve in full line, which represents the stresses in the rock enables the following observations to be made:

Between ambient temperature and a temperature $T_2$ the rock is in compression. At abient temperature, the value of the latter corresponds to the initial stresses in the earth: geostatic stress (weight of the ground), the hydrostatic pressure, the thermal stress being nil.

Between ambient temperature and $T_1$ equals about $+4°$ C., cooling reduces the compressive stress, which corresponds to contraction of the matrix and of the water in the pores:

Between $T_1$ and a point A the compression increases, on the contrary. This phenomenon corresponds to the anomaly of the expansion of water which produces maximum density at $+4°$ C., then the gradual solidification of the water in the pores. It is known that, due to the fact of the effect of capillary forces, the solidification of water in the finest pores is not reached before the region of $-100°$ C.; so that the temperature of the point A can vary fairly widely, for example, between $-0$ and $-40°$ C. or even beyond as a function of the porosity of the rock and of the amount and nature of the salts dissolved in the water. In the same way, the temperature $T_2$ can also vary between about $-10$ and $-50°$ C.

At temperatures below that of the point A, compression diminishes and then is annulled at $T_2$ and is then replaced by a tractive stress of the whole of the rock and of the ice that it contains.

In dashed line on the diagram is drawn the curve of the tensile strength of the rock.

The position of this curve is obviously very variable according to the nature of the rock. It cuts the curve of the stresses at a point B at a temperature $T_3$ comprised between $-20$ and $-100°$ C. It is at this temperature that, in the earth, the fissures appear.

In mixed lines the theoretical curve of the stresses beyond B are extended, which gives an idea of the developement of the size of the fissures which have appeared from point B. It is observed that this curve tends towards a maximum, that is to say the size of the fissures tends itself towards a maximum.

The number and distribution of the fissures are connected with the stress gradient in the earth in the zone which is in the neighbourhood of temperature $T_3$, and it is understood that, in the course of the cooling of a reservoir, the moment when the wall of the reservoir reaches this temperature $T_3$ is a moment when it is appropriate to act with a maximum of precaution, since an open fissure at this time has then a tendency to propagate in the earth.

Moreover, it is appropriate to observe that the existence of a range of temperatures wherein the rock is in compression is, a priori, a favourable element: a reservoir at low temperature is thus surrounded, at a certain distance, by a compressed zone where the fissures are closed on themselves and rendered fluid-tight on condition that they do not exceed a critical size.

There will now be described, the sequence of operations of the placing in operation of a reservoir:

In this first stage, the reservoir is excavated in conventional manner and it is fitted out, which can comprise notably the plugging of fissures and entries of water, by injections of cement or the like.

The fitting out comprises in addition, the obturation of the cavity so that it is fluid-tight to water at the temperature at which it occurs before the application of cooling, and the installation of pipes for the introduction of fluids.

In another stage, which can take place before, during or after the first stage, the mechanical and thermal characteristics of the rock are determined, and in particular the exact shape of the stress curve as a function of temperature, and that of the tensile strength curve as a function of temperature, as defined in the appended Figure.

Also the thermal characteristics are determined, the utility of which will be seen below.

Then, an initial cooling programme is established taking into account the following conditions:

It is known that the size of the fissures is connected with that of the temperature gradients, that is to say the speed of cooling. In order that a fissure should not be able to result in a penetration of water inside the reservoir, it is necessary that the water which penetrates should freeze there before entering the reservoir. This freezing depends, notably, on the shape of the fissure and its potential delivery rate, and on the amount of cold that it can receive from the surrounding rock. It hence depends also on the distance which separates it from the reservoir. It is understood that it is at the beginning of the cooling or of the exploitation of the reservoir that the ice front is closest to the latter. It is possible to calculate, approximately, the maximum dimension of acceptable fissures, knowing in particular the heat capacity and the thermal conductivity of the rock.

It is hence understood that it is possible to determine the speed of cooling which corresponds to a given size of the fissures. This determination can, in theory, be done purely by calculation. However, it is only possible to obtain acceptable results if the rocks are extremely homogeneous. In practice, the preferred method consists of establishing an initial cooling programme, by means of the data collected, then of observing the size of the fissures which are formed, for example, visually or by means of television cameras placed in the reservoir or again by extensometry, and of accelerating or slowing down the cooling with respect to the initial programme as a function of the size of the fissures.

Schematically, four types of fissures can be encountered, whether they have been produced by cooling, or whether they preexisted and had only been reopened by the latter.

(1) Fissure giving water at a sufficiently low flow rate for the contribution of frigories from the cavity or from the frozen rocky zone to be sufficient to freeze the water and to self-plug the fissure. Such a fissure is acceptable.

(2) Fissure giving water at a flow rate such that self-plugging does not occur.

Such a fissure must, obviously, be plugged if this has not been done, by conventional means such as the injection of cement, before the application of cooling. Preferably, it is sealed by self-plugging with ice. For this, the flow rate is slowed down to a value compatible with the contribution of frigories, either by injecting beyond the frozen zone a suitable sealing product under these conditions, for example polyurethanes, silica gels, $SiF_4$ etc, or, preferably and more simply, by temporarily increasing the pressure in the cavity to counterbalance in part the hydrostatic pressure.

(3) Fissure not giving water but reaching the aerated zone of the earth situated above the hydrostatic level.

Such fissures, creating gas leakages towards the atmosphere, are to be avoided at any price, for reasons of safety at the surface. For this purpose, the appropriate depth for the reservoir must be defined so that the "ice front" is below the phreatic level during the whole life span of the reservoir. It is known that, during the whole time that the reservoir is in service, as a result of the continual application of cold, the ice front, which is comprised between the isotherms at about 0 and $-20°$ C., recedes constantly from the reservoir, at a speed which depends on the thermal properties of the terrain. The hydrostatic level, on its side, is subject to seasonal variations and to development in time. The determination of the appropriate depth is hence possible as a function, notably, of the complete exploitation of the program. It is however preferable to provide temperature and hydrostatic level checking probes. In the case where the ice front and the hydrostatic level approach each other more quickly than planned, it would be appropriate to react, for example by modifying the conditions of exploitation and by raising the water level by limiting pumping or by resupplying the water level.

(4) Fissure not giving water and not passing through the ice front.

These fissures do not offer any drawback in the course of the application of cooling, that is to say as long as the cavity is filled with gas. This is not the same when the latter is filled with liquid, since this, penetrating into these fissures, suddenly disturbs the system of isotherms and creates considerable local thermal gradiants of a nature to open these fissures and to extend them beyond the ice front, through the compression zone, which would be disturbed.

It is hence imperative to close these fissures before the filling of the reservoir by liquid.

According to an important feature of the method, these fissures are plugged at the moment when they are in the neighborhood of their maximum opening.

According to an advantageous feature, the plugging is carried out simply by spraying water on the walls, so as to obtain a homogeneous coating of ice. It is also possible to provide a coating of ice charged with particles such as glass fiber. In this way advantage is taken of the helpful mechanical properties of this material at the temperature concerned. If the temperature is not too low, for example $-80°$ C., the ice coating is formed by suitably equipped human operators. If not, it is possible to raise the temperature temporarily to a level enabling human intervention.

By way of example, there is given below the program of cooling a reservoir, excavated in a terrain of which the properties had previously been determined.

The result of the preliminary examination is as follows:

(a) petrophysical properties of the matrix.

Compositon: pseudo-oolitic calcareous, with about 100% of $CaCO_3$
Apparent density dry: $\gamma d = 2.58 \ t/m^3$
Apparent density saturated: $= 2.62 \ t/m^3$
Particle density: $\gamma s = 2.69 \ t/m^3$
Average porosity: $\eta = 5\%$ (from 2% to 11%)
Existence of 2 facies: one with fine particles, the other coarser, very intermeshed
Water permeability: $K \simeq 50. \ 10^{-9}$ cm/s for coarse particles
$K \leq 10. \ 10^{-9}$ cm/s for fine particles (b) mechanical properties of the matrix (tests carried out at ambient temperature on saturated material, cores sampled at the storage level):

strengths
{ CS from 950 to 1500 bars (average 1150 bars)
  TS about 85 bars
  TS (Brasilian) about 110 bars deformability
{ E between 400,000 and 600,000 bars
  $\gamma$ from 0.25 to 0.30 intrinsic rupture curve
{ linear for $\tau p \leq 100$ bars (C = about 150 bars, $\phi = 60°$)
  parabolic beyond Anisotropy weak (c) behavior in cooling:
study of the speed of sound and of the coefficient of expansion enables it to be estimated than water freezes at about $-10°$ C. in the material.

the mechanical characteristics improve regularly with lowering of the temperature.

The initial cooling program adopted is as follows:
Passage from $+15°$ C. to $\theta 1$, with $-10°$ C. $\leq \theta 1 \leq -5°$ C., in 1 day maximum. It is possible to adopt, for example, as is the calculations, $\theta 1 = -6°$ C.

1st Level at $\theta 1$.

Passage to $\theta 2$ in a maximum of 1 day. $\theta 2$ is approximately the temperature at which the material recommences to contract under the effect of cold; in the calculations it has been taken that $\theta 2 \mp -20°$ C.

2nd Level at $\theta 2 - -20°$ C.
Drop to $-40°$ C.
3rd Level at $-40°$ C.
Drop to $-70°$ C.
4th Level at $-70°$ C.
Drop to $-100°$ C.

5th Level at −100° C.

Final gradual drop to −160° C.

The total program lasts about 7 months and can include at any moment fairly brief rises in temperature, for repairs by personnel by example. It should be understood that the temperatures mentioned are those of the wall of the excavation; those of the inner gaseous atmosphere can be deduced therefrom by thermal calculation.

In the 1st part of the cooling, the cold generating fluid is dehumidified air.

The equipment of the cavity enables it to be known at any moment, during the application of cooling:

the temperature distribution in the earth over a thickness of the order of 10 meters around the cavity.

the stress condition in the surface zone of the wall.

the deformations of the cavity.

the inflows of water and appearance of fissures.

At the end of the −40° C. stage an accurate oscultation in the cavity takes place with the personnel and the camera to determine if possible the fissures due to exceeding the tractile strength of the earth.

An identical oscultation takes place before −100° C. in order to judge the opportune moment to spray water on the walls.

Up to −100° C. the cooling is done by circulation of dehumidified cold air.

Beyond −100° C., once the cavity has been osculted and after the spraying of water for plugging the fissures, any human intervention is excluded except in the case of absolute necessity. The cooling is continued by the spraying of liquid nitrogen, so as to purge the oxygen of the air progressively, until its content in the atmosphere of the cavity is less than about 5%. It is then possible to introduce liquified natural gas to continue the cooling between about −130° C. and −160° C., and then to fill the cavity.

We claim:

1. A method of storing liquefied gases in a subterranean cavity whose fluid tightness is essentially obtained by the freezing of the earth comprising the steps of preliminarily observing the rock surrounding the cavity, preparing an initial cooling program taking into account the results of the preliminary observation, cooling the wall of the cavity and the surrounding mass to create a compression zone therein, observing the wall of the cavity and the surrounding mass during the whole period of application of cooling, and intervening according to the latter observations by modifying the initial cooling program and/or repairing disturbances which have appeared in the wall of the cavity in order to preserve the compression zone thereof.

2. The method according to claim 1 wherein the application of cooling is prolongated until a temperature of at least −100° C. is reached in the cavity.

3. The method according to claim 1 wherein the application of cooling is prolongated until a temperature range is reached generally between −40° C. to −100° C.

4. Method according to claim 1, wherein the cavity is excavated to a depth calculated so that, up to the end of the planned exploitation, the frozen zone is below the hydrostatic level.

5. Method according to claim 1, wherein, for the application of cooling, a temperature variation law is followed obeying two criteria of maintaining in the compression zone existing around the cavity, a width such that it arrests the propagation of the majority of the fissures capable of causing an entry of water into the cavity, and obtaining in the earth stress gradients such that they do not cause the appearance of such fissures.

6. Method according to claim 1, wherein at least certain of the operations, are effected by a human operator in the course of the application of cooling.

7. Method according to claim 1, wherein during the course of cooling the fissures opening into the wall of the cavity are plugged, this operation being carried out on, or in the vicinity of this wall at a temperature where the fissures have a size such that their subsequent movements cannot break the fluidtightness of the plug.

8. Method according to claim 7, wherein the fissures opening into the wall of the cavity are plugged by the spraying of water which freezes on said walls.

9. Method according to claim 1, wherein in the course of cooling, exceptional fissures resulting in the entry of water into the cavity are plugged by reducing the flow rate of water from these fissures until self-plugging by the formation of ice is obtained.

10. Method according to claim 9, wherein to reduce the flow rate in said exceptional fissures, the pressure inside the cavity is raised.

11. Method according to claim 1, wherein the cooling of the cavity is effected at least until the fissures opening into the cavity are plugged, by sending cold gas into the latter, said cold gas being a breathable gas such as dehumidified air.

12. Method for storing liquefied gases in a subterranean cavity according to claim 8, wherein in the course of cooling, exceptional fissures resulting in the entry of water into the cavity are plugged by reducing the flow rate of water from these fissures until self-plugging by the formation of ice is obtained.

* * * * *